United States Patent [19]

Amacher et al.

[11] Patent Number: 4,660,663

[45] Date of Patent: Apr. 28, 1987

[54] METHOD OF CALIBRATING A WEIGHING APPARATUS WITHIN AN ENCLOSURE

[75] Inventors: Gene L. Amacher, Cambridge; Gene R. Mathes, Zanesville; John F. Paugstat, Salesville, all of Ohio

[73] Assignee: NCR Corporation, Dayton, Ohio

[21] Appl. No.: 867,852

[22] Filed: May 27, 1986

[51] Int. Cl.$^4$ .................... G01G 19/52; G01G 23/14; G01L 25/00

[52] U.S. Cl. .................... 177/50; 177/165; 73/1 B; 364/567

[58] Field of Search .................... 177/50, 165; 73/1 B; 364/567

[56] References Cited

U.S. PATENT DOCUMENTS

| | | |
|---|---|---|
| 3,860,802 | 1/1975 | Knothe et al. |
| 4,139,069 | 2/1979 | Domis et al. |
| 4,412,298 | 10/1983 | Feinland et al. |
| 4,509,608 | 4/1985 | Hikita |
| 4,535,854 | 8/1985 | Gard et al. .................... 177/50 X |
| 4,572,309 | 2/1986 | Nishiyama .................... 177/50 |

Primary Examiner—George H. Miller, Jr.
Attorney, Agent, or Firm—Wilbert Hawk, Jr.; Albert L. Sessler, Jr.; Richard W. Lavin

[57] ABSTRACT

A method for recalibrating an electronic scale mounted within an enclosure which includes a display and a plurality of switches set to a position representing the calibrated digital output of the scale when the scale is placed in a first and second weighted condition includes the steps of displaying the weight of the weighed condition of the scale, sampling the scale to generate digital signals outputted by the scale when the scale is placed in the first and second weighted condition, comparing the sampled digital signals with the digital signals represented by the setting of the switches, removing the scale from the enclosure when the sampled digital signals are within a predetermined value of the digital signals set up in the switches and displaying the new settings of the switches which corresponds to the sampled digital signals enabling the operator to set the switches accordingly.

10 Claims, 13 Drawing Figures

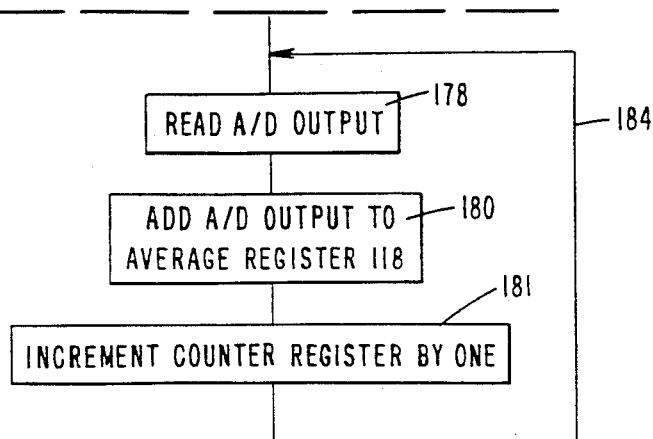
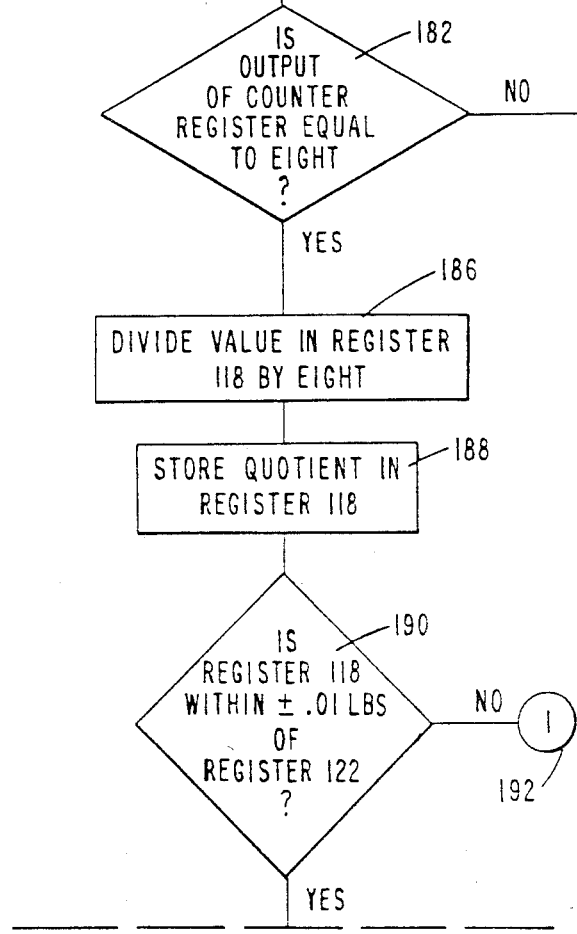

METHOD OF CALIBRATING A WEIGHING APPARATUS WITHIN AN ENCLOSURE

CROSS REFERENCE TO RELATED APPLICATIONS

Method of Calibrating a Weighing Apparatus, co-pending application, Ser. No. 868,925, filed on even date herewith, invented by Gene L. Amacher, Gene R. Mathes and John F. Paugstat, assigned to the NCR Corporation.

Automatic Zero Balancing of a Weighing Apparatus, co-pending application, Ser. No. 868,926, filed on even date herewith, invented by Gene L. Amacher, Gene R. Mathes and John F. Paugstat, assigned to the NCR Corporation.

Method of Fast Weighing, co-pending application, Ser. No. 867,650, filed on even date herewith invented by Gene L. Amacher, Gene R. Mathes and John F. Paugstat, assigned to the NCR Corporation.

Method for Controlling Terminal Display Indication, co-pending application, Ser. No. 867,658, filed on even date herewith, invented by Gene L. Amacher, Gene R. Mathes and John F. Paugstat, assigned to the NCR Corporation.

BACKGROUND OF THE INVENTION

The present invention is directed to a weight measuring apparatus and more particularly to a method for calibrating a weighing scale so as to meet Federal standards concerning the accuracy of the scale for measuring weights placed on the scale.

Weighing scales are found in supermarkets or the like for weighing produce or other merchandise items and must meet stringent requirements as to performance and cost. The scales must be accurate enough to satisfy public weights and measures authorities. These requirements are usually met at the time the scale is manufactured by means of a standard calibrating procedure which includes setting switches representing the scale output upon the application of a standard weight and when no weight is applied. After the switches are set, the location of the switches is then sealed. As disclosed in the above cited co-pending application, Ser. No. 868,925, a check-out system includes a scale mounted within a check-out counter. It was found in some instances that once a calibrated scale was mounted within the check-out counter, it went out of calibration due to the temperature found within the counter. If the scale was removed, it was found to be within the required calibrated range. It was thus required that the recalibration of the scale take place within the check-out counter.

It is therefore a principal object of this invention to provide a method for recalibrating a weighing scale mounted within an enclosure which has been calibrated and sealed which is simple in its operation and can be accomplished in a minimum amount of time.

SUMMARY OF THE INVENTION

This and other objects of the invention are fulfilled in a weighing system which includes a processor, a display connected to the processor, a calibrated scale mounted within an enclosure outputting digital signals having a value representing the weight of an item placed on the scale and a plurality of first and second settable switches set to a position representing the digital signals outputted by the scale when a corresponding calibrated first and second weight is placed on the scale, a method for recalibrating the scale when mounted within the enclosure including the steps of placing the first weight on the scale, applying power to the system sampling the output signals of the scale, comparing the sampled output signals of the scale with the digital signals represented by the settings of the first plurality of switches, removing the scale from the enclosure when the sampled output signals of the scale are within a first predetermined value of the digital signals set in the first plurality of switches, displaying the settings of the first plurality of switches to correspond to the sampled output signals of the scale and setting the first plurality of switches in accordance with the settings displayed on the display.

BRIEF DESCRIPTION OF THE DRAWINGS

FIG. 8 is a diagram showing how FIGS. 9A–9D inclusive are assembled.

FIGS. 9A–9E inclusive are flow charts illustrating diagrammatically the steps of the calibrating procedure of the present invention.

DESCRIPTION OF THE PREFERRED EMBODIMENT

Figure 1:
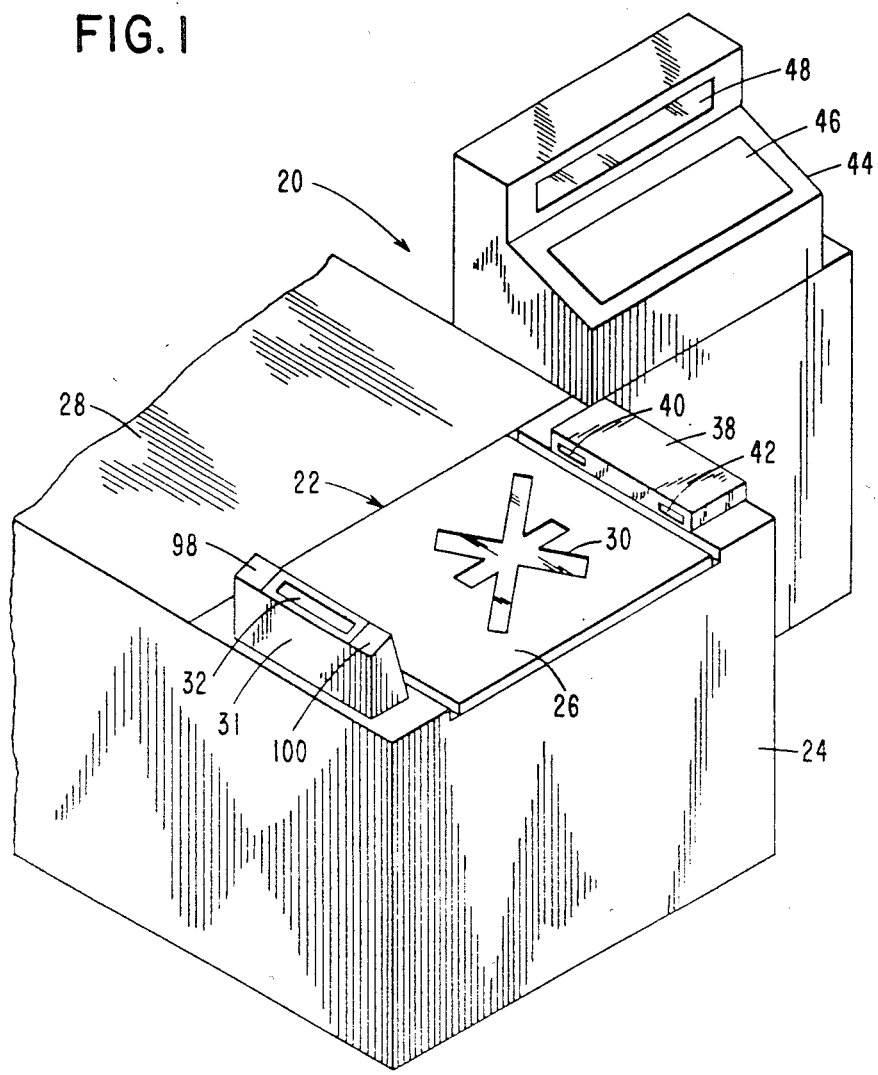
FIG. 1 is a perspective view of a check-out system which includes a scale for weighing purchased merchandise items.

Referring now to FIG. 1, there is shown a perspective view of a merchandise check-out system generally indicated by the numeral 20 in which a scale 22 is utilized to weigh a purchase item. The scale is located within a check-out counter 24 and includes a scale lid or load plate 26 movably mounted flush with the top surface 28 of the check-out counter 24. The scale lid 26 includes an aperture 30 through which scanning beams from a scanner assembly 36 (FIG. 2), mounted beneath the scale within the check-out counter, are projected for scanning a bar code label (not shown) on a merchandise item positioned on the scale lid 26 in a manner that is well known in the art. Mounted adjacent the scale lid 26 on the surface 28 of the check-out counter 24 is a housing member 31 in which is located a customer display 32 which displays the price of the merchandise item scanned and also the weight of the item as the result of a weighing operation. Located adjacent on either side of the display 32 within the housing 31 are a pair of signal lights 98, 100 one red and one green, which are operated to indicate whether a weighing operation or a scanning operation was successful or not. Opposite the housing 31 on the surface 28 of the counter 24, is a housing 38 in which is located a pair of photoelectric cells 40, 42 which detect the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device for processing the sales transaction and includes a keyboard 46 and a display 48. The display 32 is an alphanumeric LCD display and can be operated automatically or by the manual operation of a key on the keyboard 46.

Figure 2:
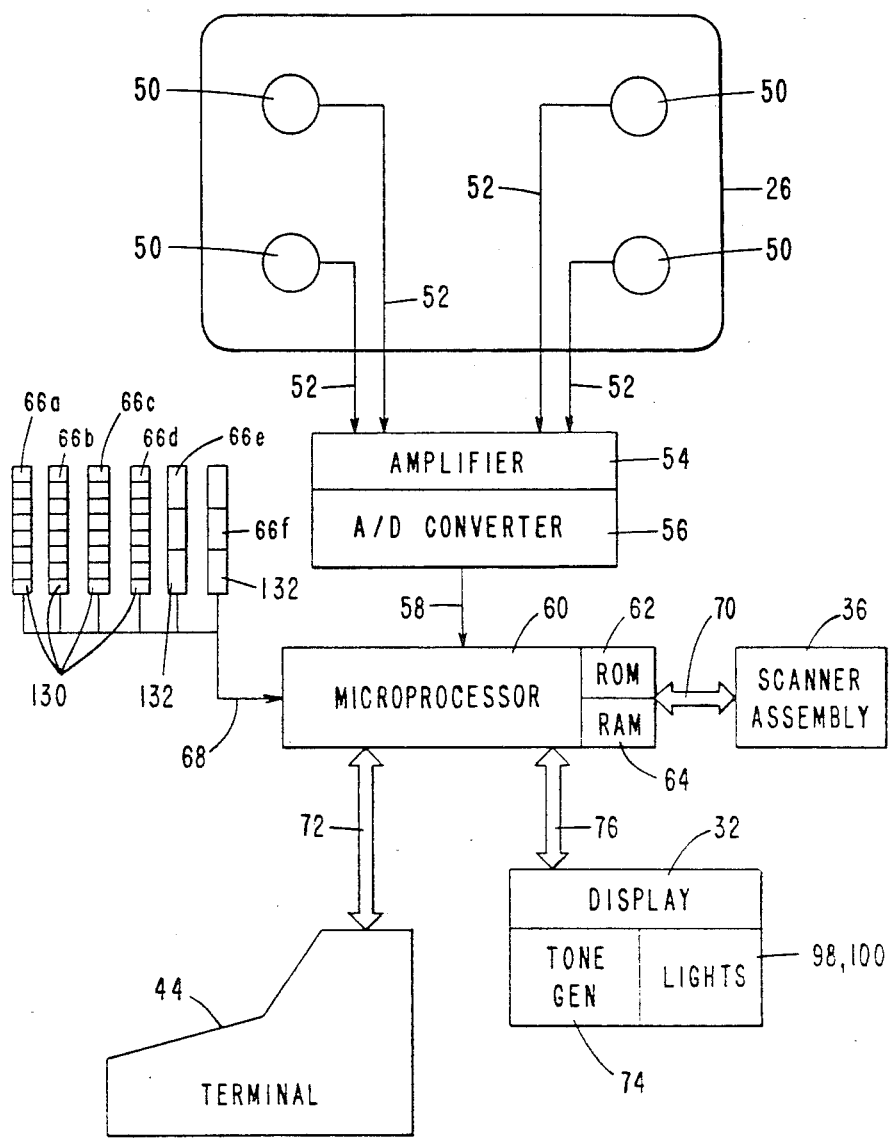
FIG. 2 is a schematic representation of the check-out system of FIG. 1 in which the scale microprocessor is used in the calibration of the scale.
Figure 4:
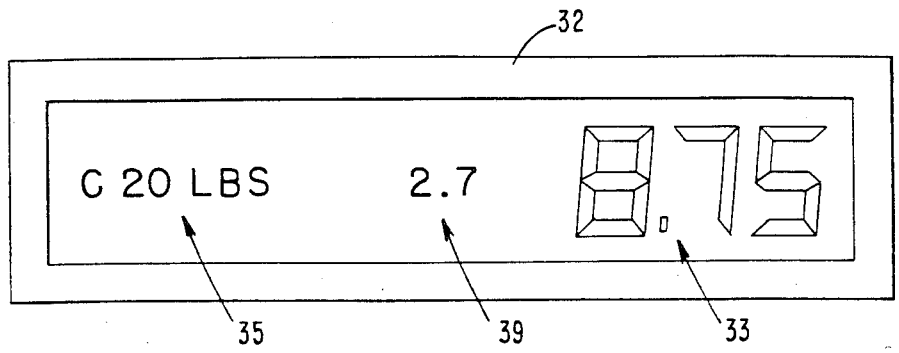
FIG. 4 is a plan view of the customer display showing the display of price information of a scanned merchandise item and the instructions for placing a predetermined weight on the scale and the setting of the switches.

Referring now to FIG. 2, there is shown a schematic representation of the check-out system 20 (FIG. 1) in which the scale 22 includes four load cells 50 secured to the scale lid 26 and which output analog signals over lines 52 to an amplifier 54 in response to the placing of a weighted item on the lid 26. The amplified analog signals are then transmitted to a A/D converter 56 which outputs digital signals over line 58 to a microprocessor 60 which includes a ROM memory unit 62 in which is stored the program for calibrating the scale 22 and a RAM memory unit 64 in which data used in calibrating the scale is stored as will be described more fully hereinafter. The microprocessor 60 is connected to six banks of switches 66a-66f inclusive over cable 68; to the scanner assembly 36 over bus 70; to the terminal 44 over bus 72; and to the display 32, the signal lights 98, 100 and to a tone generator 74 over bus 76. The microprocessor 60 monitors the operation of the scanner assembly 36 over bus 70. When the scanner is in operation, the microprocessor 60 controls the display 32 to display the item price or total sales 33 (FIG. 4) in response to data received from the terminal 44. The microprocessor 60 will also control the display 32 to display the item weight 29 (FIG. 5) in response to a scale operation. The microprocessor 60 further controls the signal lights 98, 100 and the tone generator 74 in response to the operation of the scanner and the scale indicating a valid or invalid operation as will be explained more fully hereinafter.

Figure 3:
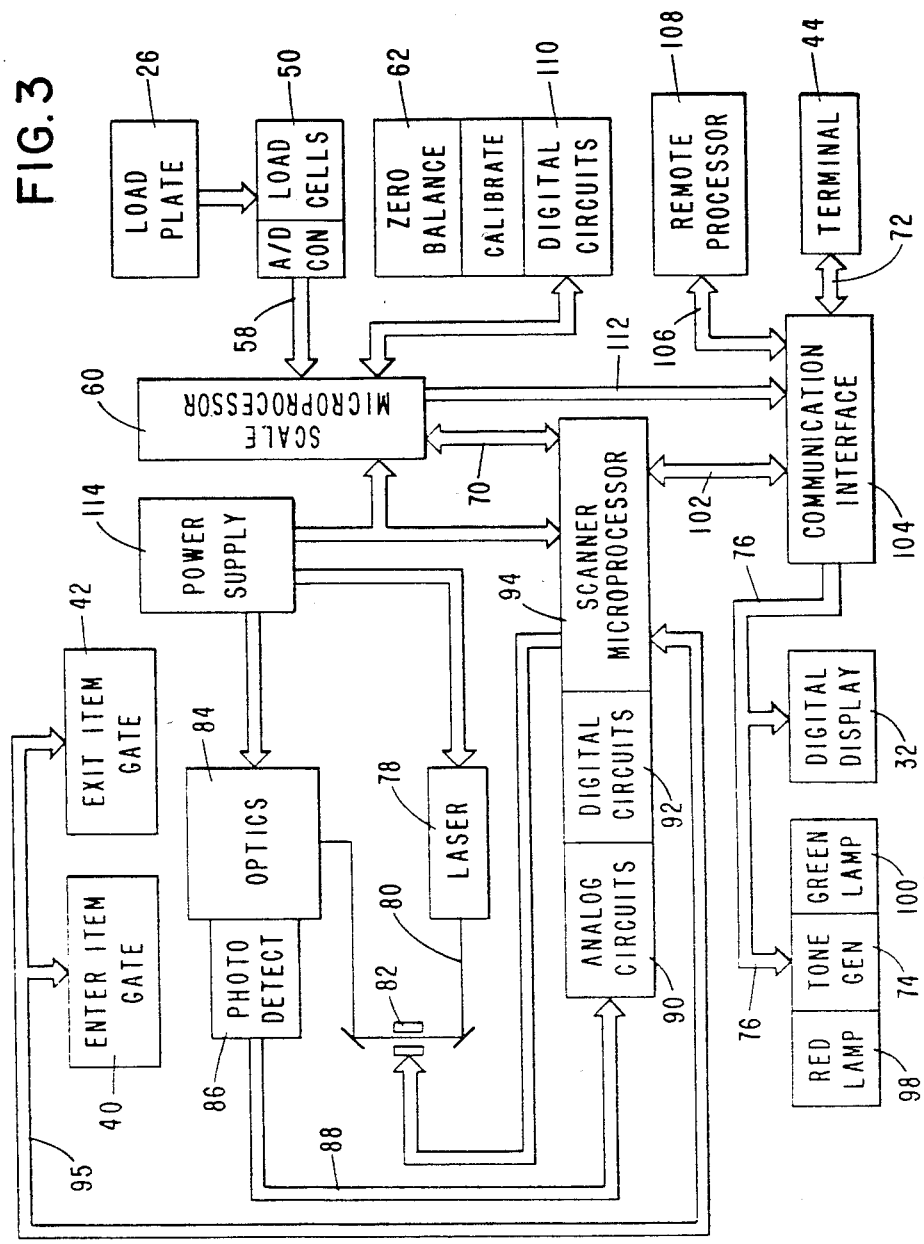
FIG. 3 is a functional block diagram of the check-out system of FIG. 1.

Referring now to FIG. 3, there is disclosed a more detailed functional block diagram of the check-out system 20 in which the scanner assembly 36 (FIG. 2) includes a laser light 78 which outputs a light beam 80 through a shutter assembly 82 to a rotating optical assembly 84 which in turn directs the reflected light beams through the aperture 30 (FIG. 1) in the scale lid 26. The scanning light beam scans the bar code label on a merchandise item positioned on the lid 26. The light beams are then reflected from the bar code label back through the aperture 30 to a photo-detector 86 which outputs an analog signal representing the coded data read over the bus 88 to the analog circuit section 90 where the signals are amplified and transferred to the digital circuit section 92. The digital circuit section 92 converts the analog signals to digital data signals. The data signals are then transferred to a scanner microprocessor 94. The microprocessor 94 will also receive signals over bus 95 from the enter item gate 40 and the exit item gate 42 indicating the presence of a merchandise item. In response to receiving the signals from the item gate 40, the microprocessor operates the shutter assembly 82 allowing the laser beam to scan the merchandise item. A signal from the exit item gate 42 turns off the shutter assembly.

The microprocessor 94 using the data received determines whether a good or bad read operation has occurred. If a bad read operation has occurred, the microprocessor 94 will output a control signal over bus 70 to the microprocessor 60 which operates the red lamp 98 by transmitting the appropriate signals over bus 112, a communication interface 104 and bus 76 to lamp 98. The red lamp 98 indicates to the operator that the merchandise item should be rescanned. If a good read has occurred, a green lamp 100, which is also part of the signal lights 34, is illuminated and the tone generator 74 is operated to output a sound signal indicating to the operator that a good read had occurred. For a complete disclosure of the operation of the item gates 40, 42 and the lamps 98, 100, reference should be made to U.S. Pat. No. 4,086,476 issued to R. J. King and assigned to the assignee of the present application.

The data signals received by the microprocessor 94 identify the merchandise item being scanned. This information is transmitted over bus 102 to the communication interface 104 which transfers the data over bus 106 to a remote processor 108. The processor 108 using this data retrieves the price of the item from a price look-up table (not shown) located within the processor and transmits the price of the item to the microprocessor 94 through the interface 104 and over bus 102 to the display 32. The price of the item 33 (FIG. 4) is displayed in the customer digital display 32 and transmitted over bus 72 to the display 48 (FIG. 1) in the terminal 44.

The scale 22 includes the load plate 26 (FIG. 1), the load cells 50 (FIG. 2), the microprocessor 60, the ROM memory unit 62 in which is stored the programs for zero balancing and calibrating the scale, and a digital circuit section 110 by which the programs and the memory unit 62 interface with the microprocessor 60. Power is supplied to the system by means of the power supply 114.

Figure 5:
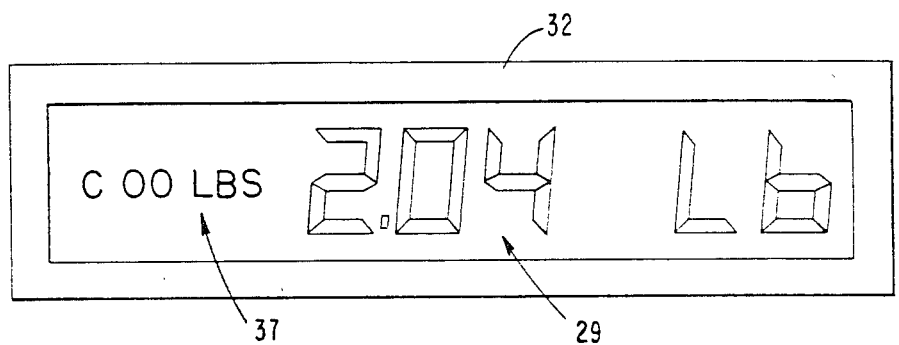
FIG. 5 is a plan view of the customer display showing the display of the weight of a purchased item and the instructions for placing a predetermined weight on the scale.

When a scale operation is required, the operator will place the item to be weighed on the load plate 26 (FIG. 2) which transfers the load to the load cells 50. The cells 50 will output analog signals to the amplifier 54 (FIG. 2), the A/D converter 56 (FIGS. 2 and 3) and to the microprocessor 60. The microprocessor 60 computes the weight from the digital signals outputted by the A/D converter 56 in a manner that is well known in the art and actuates the digital display 32 to display the weight 35 (FIG. 5). The weight data is also transmitted over bus 112 to the communication interface 104 which transfers the data to the terminal 44 over bus 72. The terminal obtains the price per pound data from the remote processor 108 through the interface 104 and computes the item price, prints the item price on the customer receipt, displays the item price in the terminal display 48 (FIG. 1) and transmits the item price to the scanner microprocessor 94 which displays the price 33 (FIG. 4) in the customer digital display 32. The microprocessor 94 will operate the green lamp 100 and the tone generator 74 through the microprocessor 60 if the operation is a good weighing operation and the red lamp 98 if it is a bad weighing operation.

Figure 6:
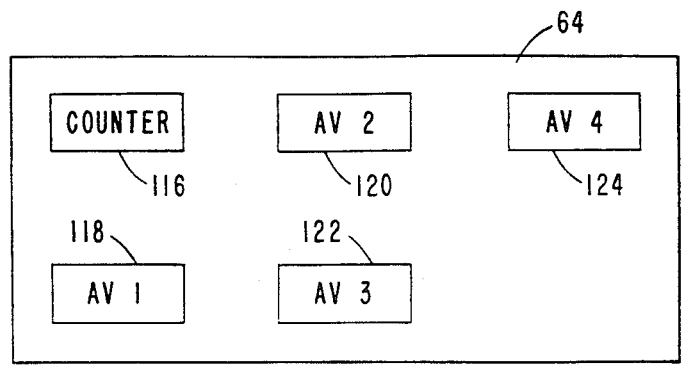
FIG. 6 is a block diagram of the RAM memory unit located in the microprocessor showing the memory locations of the storage registers associated with the calibrating procedure.

Referring now to FIG. 6, there is disclosed a block diagram of the RAM memory unit 64 (FIG. 2) showing the location of various storage registers used in the recalibration procedure. Included is a counter register 116 for outputting a plurality of binary counts and four registers 118-124 inclusive for storing the average reading of a plurality of readings of the A/D converter 56 (FIG. 2) output. The storage registers 118 and 120 store the current average output readings of the A/D converter 56 while the registers 122 and 124 store previous average readings of the converter.

Figure 7:
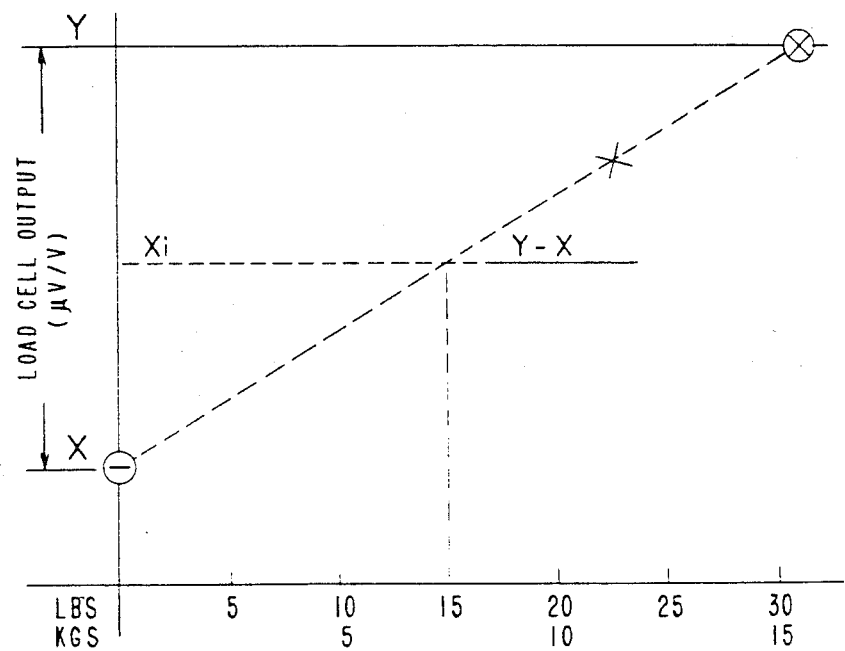
FIG. 7 is a schematic diagram of a graph illustrating the output of the load cells of the scale in accordance with the weight placed on the scale.

Referring now to FIG. 7, there is shown a schematic of a graph illustrating the output of the load cell 50 of the scale in microvolts/volt in accordance with the weight in pounds or kilograms placed on the scale. As shown, the output of the load cells has a straight line relationship with the corresponding weights placed on the scale. In the diagram, X represents the recorded output for zero lbs., Y the recorded output for 30 lbs. or 15 kgs. and Xi the recorded output for a given weight with the net weight represented by the equation $Xi - X/Y - X$.

Referring now to FIGS. 9A–9E inclusive, there is shown a flow chart of the calibration procedure with the scale mounted within the check-out counter 24 (FIG. 1). FIG. 8 shows the manner in which FIGS. 9A–9E inclusive should be assembled. The switches 130 in the switch banks 66a and 66b (FIG. 2) have been set to represent a sixteen binary bit value representing the digital equivalent of the calibrated voltage output of the load cells 50 when a twenty pound weight has been placed on the scale. In a similar manner, the switches 130 in the switch banks 66c and 66d are set to represent the calibrated voltage output of the cells 50 when the scale is at rest with no weight placed on the scale. The switches 130 have been set as a result of a previous calibration of the scale before the scale was installed in the check-out counter 24 in the manner disclosed in the previously cited co-pending application Ser. No. 868,925. The switches 130 are of the on-off construction in which the on position of the switch represents a binary one bit while the off position represents a binary zero bit.

At the start (block 125) (FIG. 9A) of the calibration procedure, the operator will place a twenty pound weight on the scale (block 126) and then turn on the power to the check-out system (block 128). In response to the turning on of the power, the microprocessor 60 (FIG. 2) will read the digital output of the A/D converter (block 131) and compare that reading with the digital value stored in switches 130 of the switch banks 66a and 66b (block 133) representing the calibrated output readings of the scale for 20 lbs. If the digital output reading of the A/D converter is not (block 134) within plus or minus 1.15 lbs. of the digital value set up in the switches 130 of the switch banks 66a and 66b, the processor will end the calibration procedure (block 135) requiring that the scale be removed from the check-out counter and recalibrated with the switches 130 in the switch banks 66a–66d inclusive (FIG. 2) set to their zero position prior to the start of the calibration procedure. Reference should be made to the previously cited Ser. No. 868,925 for a description of the calibration procedure when the scale is out of the check-out counter 24.

If the current reading of the A/D converter is within plus or minus 1.15 lbs. of the value stored in the switch settings, the microprocessor 60 will set the average register 118 to zero (block 136) and the average register 120 to zero (block 138) by loading the registers with zeros. The microprocessor 60 then transfers the data stored in register 118 to the register 122 (block 140) and transfers the data stored in the average register 120 to the register 124 (block 142) (FIG. 9B) which in the present situation are zero. Again, the registers 118 and 120 are loaded with zeros. The microprocessor controls the display 32 (FIGS. 1 and 2) to display the "C20 lbs" logo 35 (FIG. 4) (block 144) which tells the operator to place a twenty pound weight on the scale (block 146). At the beginning of the calibration operation, the twenty pound weight has already been placed on the scale by the operator. The microprocessor then reads the output of the A/D converter 56 (Block 147), compares (block 148) the A/D reading with the reading set up in the 20 lbs. switches 130 of the switch banks 66a and 66b (FIG. 2) and checks (block 149) to see if the A/D reading is within ±1.15 lbs. of the switch settings. If it is not, the microprocessor will return over path 150 to display the logo "C20 lbs" logo 35 (block 144) and the reading operation is repeated until the A/D output is within the stated limits. The microprocessor 60 then sets the counter register 116 (FIG. 6) to zero (block 151), reads the output of the A/D converter (block 152), adds that reading to the average register 120 (block 153) (FIG. 9C) and increments the counter register 116 by one (block 154).

The microprocessor checks the output of the counter register 116 (block 156) to see if the count is eight. If it is not, the microprocessor returns over path 158 and reads the output of the A/D converter (block 152) seven more times until the count in the counter register 116 is equal to the count of eight. When this occurs, the microprocessor divides the data stored in the register 118 representing the sum of eight consecutive readings of the output of the A/D converter 56 by eight (block 160) and stores (block 162) the quotient in the register 120 (FIG. 6).

The microprocessor 60 then displays the "C00 lbs." logo 37 (FIG. 5) on the display 32 (FIGS. 1 and 2) (block 164). The operator in response to the display of the logo "C00 lbs" will remove the twenty pound weight from the scale (block 166) after which the microprocessor 60 reads the output of the A/D converter 56 (block 168) and compares (block 170) that reading with the digital reading set up in the switches 130 of the switch banks 66c and 66d (FIG. 2) representing the scale output for a zero weight condition. The microprocessor 60 checks to see if the corresponding weight output of the A/D converter is within a limit of plus or minus 1.15 lbs. of the representative weight value set up in the switches in the switch banks 66c and 66d (block 172).

If the reading of the A/D converter 56 is not within the stated limit, the microprocessor returns over path 174 and again displays the "C00 lbs." logo 37 (block 164) and repeats the reading sequence (blocks 166–170) until a reading is obtained which is within the limit. The microprocessor then sets the counter register 116 (FIG. 6) to zero (block 176), reads the output of the A/D converter 56 (block 178) (FIG. 9D) and adds that reading to the register 118 (block 180). The microprocessor checks to see if the output of the counter register 116 is equal to eight (block 182). If not, the microprocessor will, over path 184, repeat the reading of the A/D converter (block 178) until the output count of register 116 is equal to eight. At that time the microprocessor will divide the data stored in the register 118 by eight (block 186) and store the quotient in register 118 (block 188).

Figure 9A:
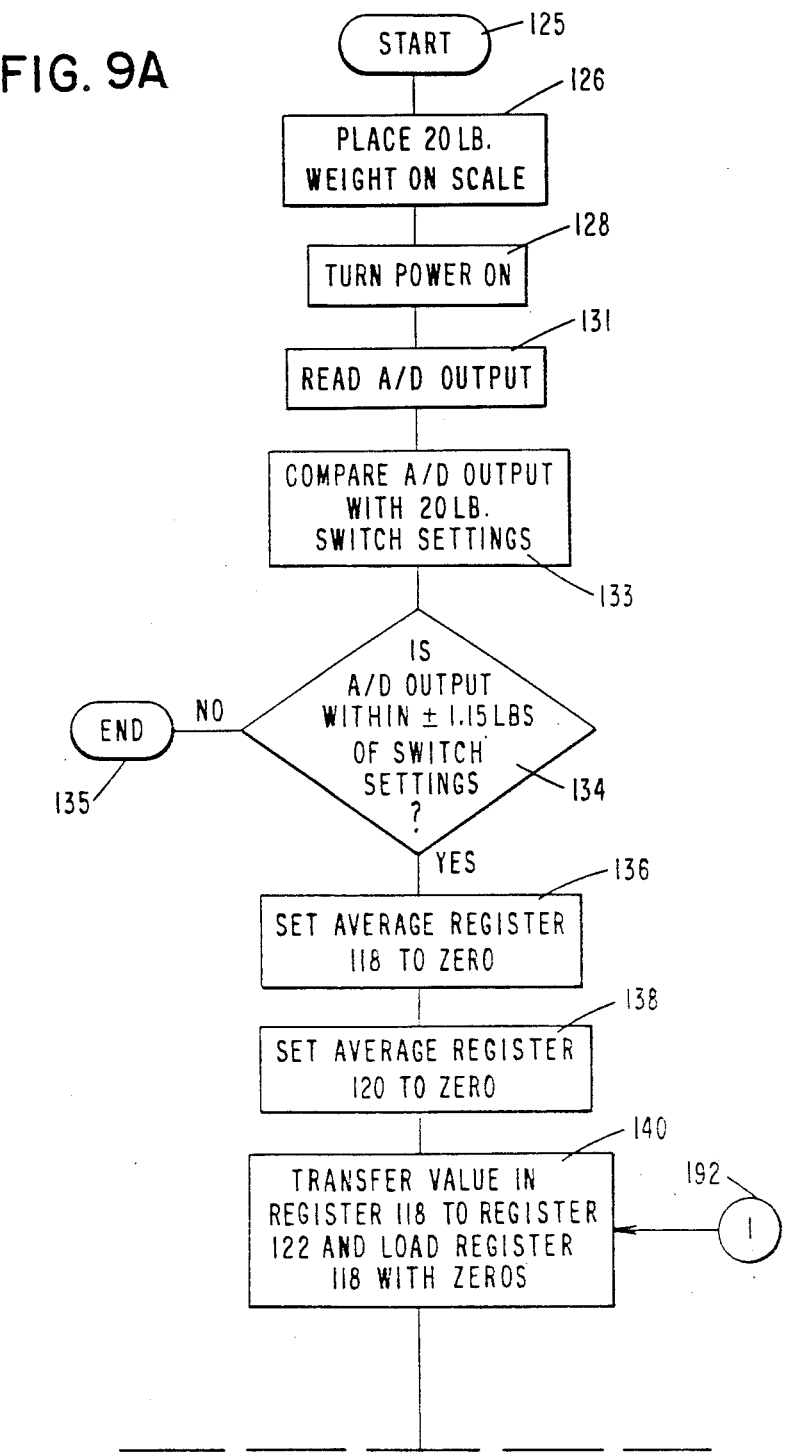
Figure 9B:
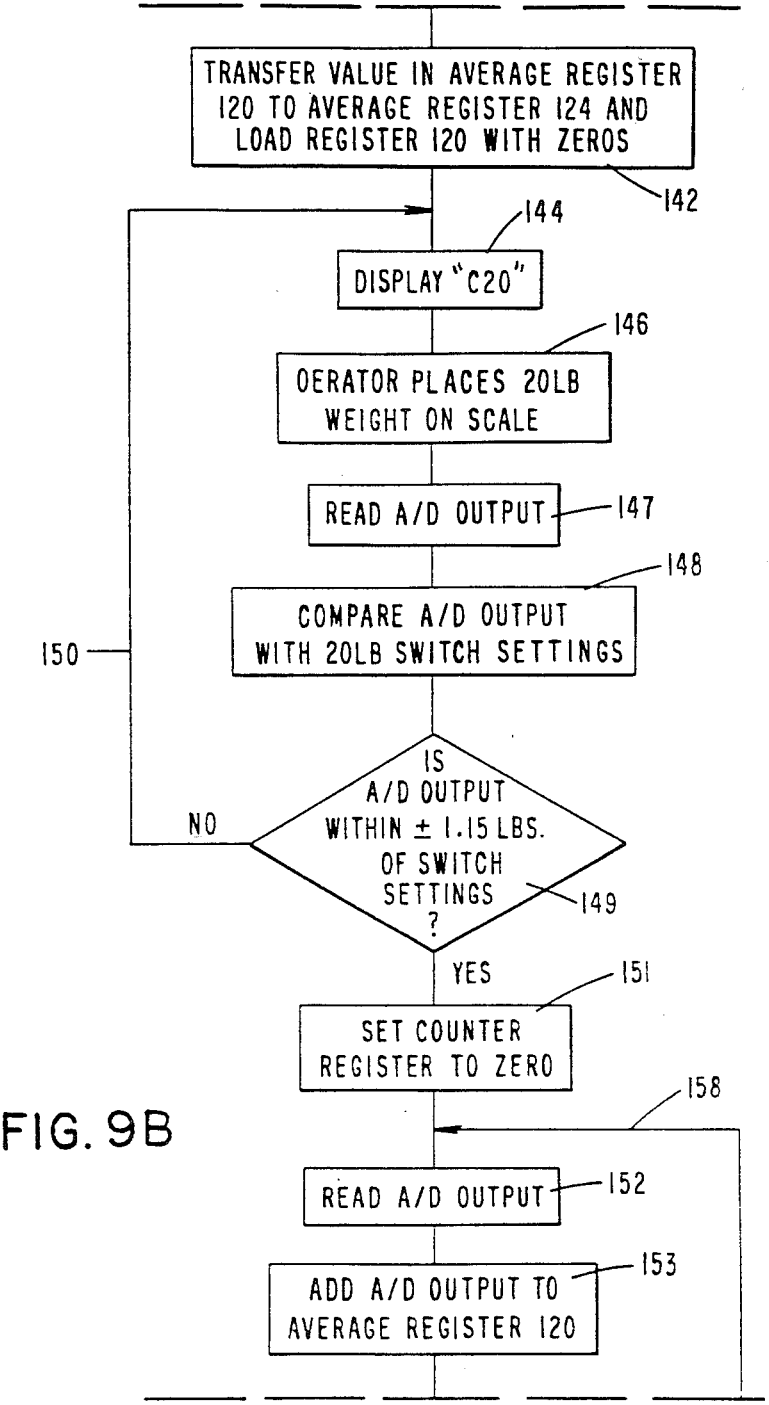
Figure 9C:
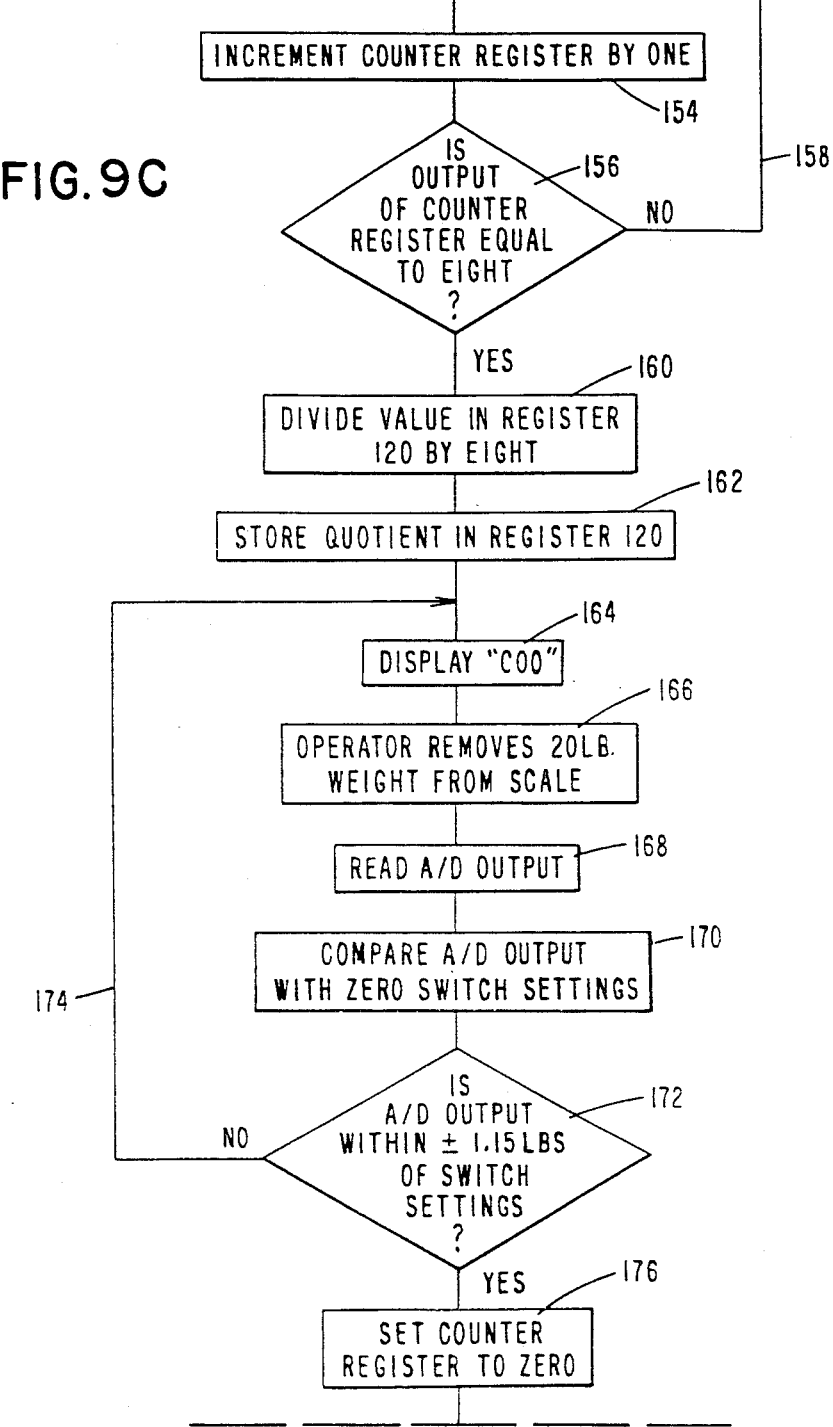
Figure 9E:
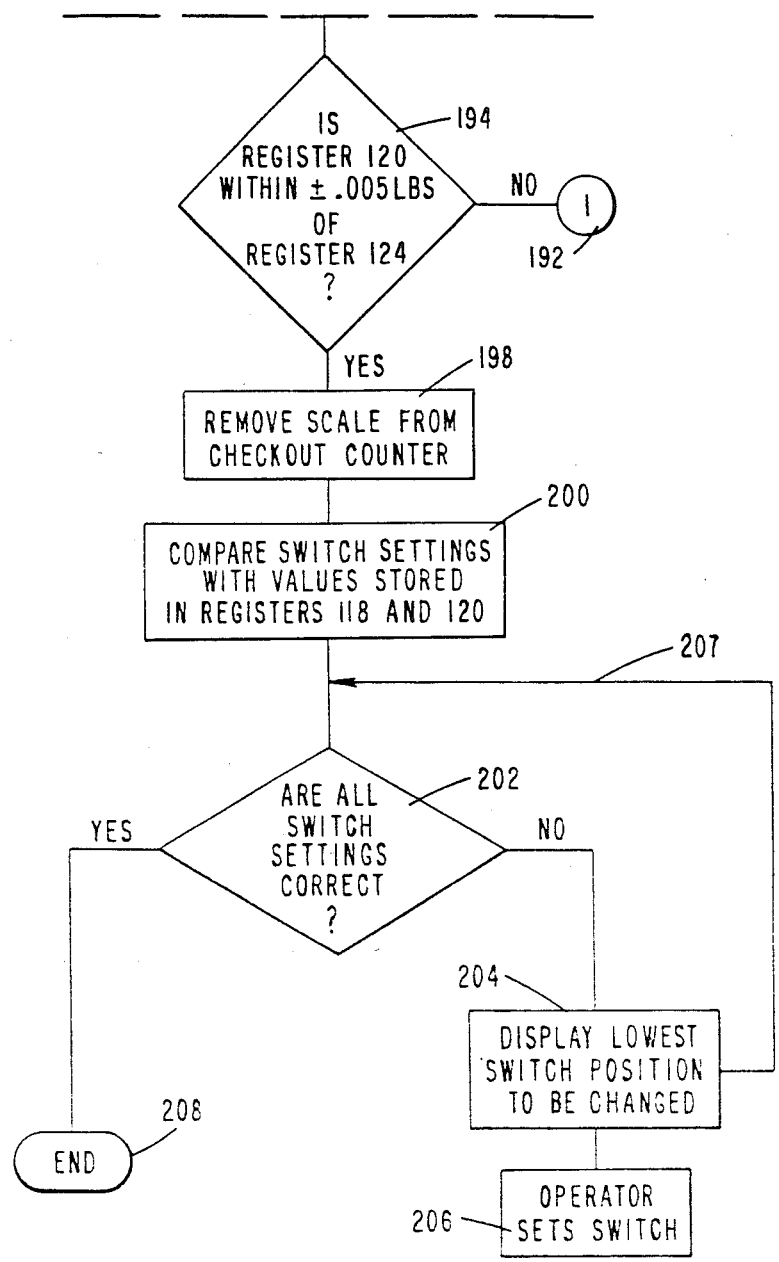

The microprocessor 60 then compares the readings stored in register 118 and register 122 (block 190) representing zero pound readings. If the readings are not within the limit of plus or minus 0.01 pounds of each other, the microprocessor will return over circled "1" symbol 192 and again transfer the value stored in register 118 to the register 122 (block 140). The microprocessor then repeats the steps for generating readings corresponding to the placing of a twenty pound weight and zero pound weights on the scale until the corresponding zero pound weight reading stored in register 118 is within plus or minus 0.01 lbs. of the zero pound reading stored in the register 122. When this occurs, the microprocessor compares the twenty pound reading stored in register 120 with the twenty pound reading stored in register 124 (block 194) (FIG. 9E).

If the readings in registers 122 and 124 (FIG. 6) are not within the limit of plus or minus 0.005 lbs. of each other, the microprocessor will return over circled "1" symbol 192 and repeat the steps of taking readings when twenty pounds and zero pounds are applied to the scale in the manner described above. When the twenty pound readings in registers 120 and 124 are within plus or minus, 0.005 lbs. of each other, the operator removes the scale from the check-out counter 24 (FIG. 1) (block 198). The microprocessor 60 then compares (block 200) the setting of the switches 130 in the switch banks 66a–66d inclusive (FIG. 2) with the corresponding readings stored in the registers 118 and 124 (block 200). If the switch settings are correct, (block 202), the microprocessor will end the recalibration procedure. If the switch settings are incorrect, the microprocessor (block 204) displays the lowest switch setting of the remaining switches that has to be changed on the display 32 (FIG. 1). For example, if the seventh switch in bank 66b (FIG. 2) is required to be changed, the "2.7" logo 39 (FIG. 4) would be displayed. In response to the display, the operator sets (block 206) the switches in accordance with the instructions on the display. The microprocessor will return, over path 207 and check to see if all the switch settings are correct (block 202). When all switch settings are found to be correct, the microprocessor will end the recalibration procedure (block 208) and the scale is replaced within the check-out counter 24 (FIG. 1).

It will be seen that the recalibration procedure described herein requires only that the operator follow the instructions displayed on the display. This requirement eliminates any chance of human error entering into the calibration procedure.

While the salient features of the invention have been illustrated and described it should be readily apparent to those skilled in the art that many changes and modifications can be made in the invention presented without departing from the spirit and true scope of the invention. While the two weight condition have been designated in the present embodiment as 20 lbs. and 0 lbs, it is obvious that any other two weights can be employed without departing from the scope of the invention. Accordingly, the present invention should be considered as encompassing all such changes and modifications of the invention that fall within the broad scope of the invention as defined by the appended claims.

We claim:

1. In a weighing system which includes a processor, a display connected to the processor, a calibrated scale mounted within an enclosure and outputting digital signals having a value representing the weight of an object placed on the scale and a plurality of first and second settable switches set to a position representing the first and second digital values outputted by the scale when a corresponding first and second weight is placed on the scale, a method for recalibrating the scale when mounted within the enclosure comprising the steps of:

placing an object having a first weight on the scale to put the scale in a first weighted condition;

applying power to the system;

performing a first sampling operation of the output of the scale in response to the application of power to the system to generate a third digital value representing the output of the scale for said first weight;

comparing the third digital value with the first digital value;

displaying the first weight on the display when the third digital value is within a first predetermined value of the first digital value;

performing a second sampling operation of the output of the scale to establish a first average digital value outputted by the scale when the first weight is placed on the scale;

comparing the first average digital value with the third digital value;

removing the scale from the enclosure when the first average digital value is within the first predetermined value of the third digital value;

comparing the digital value represented by the setting of the first settable switches with the first average digital value;

displaying on the display the setting of the first settable switches to represent the first average digital value; and setting the first settable switches in accordance with the setting displayed on the display.

2. The method of claim 1 in which the step of displaying the settings of the first settable switches include the step of assigning a position to each of the first settable switches from highest to lowest and displaying the lowest switch position of the remaining first settable switches to be changed.

3. The method of claim 1 in which the first weight of the object placed on the scale is 20 pounds.

4. The method of claim 1 in which the step of sampling the output of the scale to establish a first average digital value further includes the steps of:

performing a third sampling operation of the output of the scale a predetermined number of times;

summing the number of sampled outputs of the scale;

dividing the sum by the predetermined number to obtain the first average digital value; and storing the first average digital value.

5. The method of claim 1, also including the steps of:

displaying instructions to place the scale in a second weighted condition in response to the establishment of the first average digital value;

placing the scale in a second weighted condition;

performing a third sampling operation of the output of the scale to generate a fourth digital value representing the output of the scale for the second weighted condition of the scale;

comparing the fourth digital value with the second digital value;

performing a fourth sampling operation of the output of the scale to generate a second average of the digital value when the fourth digital value is within a first predetermined value of the second digital value;

comparing the second average digital value with the third digital value; and removing the scale from the enclosure when the second average digital value is within a second predetermined value of the third digital value.

6. The method of claim 4, also including the steps of:
comparing the second digital value with the second average digital value;
displaying the setting of the plurality of second switches to represent the second average digital value; and
setting the plurality of second switches in accordance with the settings displayed on the display.

7. The method of claim 6 in which the second weighted condition of the scale is zero pounds.

8. The method of claim 5 in which the step of sampling the output of the scale to generate a second average digital value further includes the steps of:
performing a fifth sampling operation of the output of the scale a predetermine number of times;
summing the number of sampled outputs of the scale;
dividing the sum by the predetermined number to obtain the second average digital value; and
storing the second average digital value.

9. In a weighing system which includes a processor, a display connected to the processor, a calibrated scale mounted within an enclosure and outputting a digital value representing the weight of a merchandise item positioned on the scale and a plurality of first and second settable switches set to a calibrated position representing first and second digital values, respectively, outputted by the scale when in a corresponding first and second weighted condition, a method for recalibrating the scale when mounted within the enclosure comprising the steps of:
placing the scale in said first weighted condition;
applying power to the system;
performing a first sampling operation of sampling the output of the scale in response to the application of power to the system to generate a third digital value representing the output of the scale for said first weighted condition;
comparing the third digital value with the first digital value;
displaying the weight of said first weighted condition on a display when the third digital value is within a first predetermined value of the first digital value;
performing a second sampling operation of the output of the scale a predetermined number of times to establish an average third digital value outputted by the scale when the third digital value is within said first predetermined value of the first digital value;
displaying the weight of said second weighted condition on the display;
placing the scale in said second weighted condition;
performing a third sampling operation of the output of the scale in response to the displaying of the weight of said second weighted condition on the display to generate a fourth digital value;
comparing the fourth digital value with the second digital value;
performing a fourth sampling operation of the output of the scale a predetermined number of times to establish an average fourth digital value when the fourth digital value is within said first predetermine value of the second digital value;
comparing the average fourth digital value with the second digital value;
comparing the average third digital value with the first digital value;
removing the scale from the enclosure when the average fourth digital value is within a second predetermined value of the second digital value and the average third digital value is within a third predetermined value of the first digital value;
comparing the settings of the first and second plurality of settable switches with the third and fourth average digital values;
displaying the settings of the first and second plurality of settable switches to represent said third and fourth average digital values, respectively; and
setting the first and second plurality of settable switches in accordance with the settings displayed on the display.

10. The method of claim 9 in which the weight of the first weighted condition is 20 pounds and the weight of the second weighted condition is zero pounds.

* * * * *